United States Patent Office 3,250,652
Patented May 10, 1966

3,250,652
EXOTHERMIC COMPOSITION CONTAINING ZINC AND AMMONIUM CHLORIDE
John E. Claiborne, 814 Boagni St., Opelousas, La.
No Drawing. Filed Feb. 3, 1964, Ser. No. 342,287
3 Claims. (Cl. 149—43)

This invention relates to exothermic gas producing compositions. More specifically it relates to such compositions comprising metallic zinc, ammonium nitrate and ammonium chloride.

Compositions which react exothermically with water are known, their principal uses being in the fields of chemical heaters, hair waving pads and the cleaning of grease clogged drains. For such purposes the presence of a flame in the use of the composition is undesirable, and accordingly the prior art developments have been directed toward compositions which are flameless in use.

It is among the objects of this invention to provide exothermic compositions which yield valuable gaseous products.

A further object is to provide exothermic compositions which upon the addition of water spontaneously produce a flame.

A further object is to provide exothermic compositions which produce hot expanding gases and which are useful as propellants for missiles and the like.

Other objects of the invention are to provide compositions useful as incendiaries, nuclear blast simulators, and for other purposes requiring spontaneous emission of heat and gases.

Further objects and advantages will be apparent to those skilled in the art.

The compositions of this invention comprise intimate mixtures of a finely divided reactive metal, preferably zinc, ammonium chloride and ammonium nitrate. The relative propositions are not critical, operative ranges being in the range of from about 10 to 70% by weight of each ingredient, the total equalling 100%. A preferred composition contains equal parts by weight of metal, ammonium chloride and ammonium nitrate.

The particle size of the ingredients is also not critical, but smaller particles yield more rapidly acting compositions. In general, metal particles of 10 to 100 mesh may be employed and the ammonium salts may also be in this range or finer such as 250 mesh. The materials are intimately mixed, preferably in a dry atmosphere and the materials themselves must be dry. Inert diluents such as bentonite, clay, wood, flour and the like may also be added, their presence serving to diminish the reaction rate if such be desirable. The composition may be employed in the form of a loose mass of particles or if desired, anhydrous binders such as heat softenable gums, thermoplastic resins or lacquers may be added and the mixture pressed into blocks of desired configuration. Similarly, such plasticized binder-containing mixtures may be extruded into continuous shaped lengths by methods well known in the art.

The amount of water necessary to initiate the exothermic reaction is small. Thus, for a mass of five grams of a mixture containing equal parts by weight of zinc powder, ammonium chloride and ammonium nitrate, two to three drops of water will initiate a sustained reaction. In high humidity atmospheres, the hygroscopic nature of the ammonium salts will pick up enough water to initiate the reaction after a period of time, thereby rendering the composition useful as a spontaneous incendiary.

The gaseous reaction products include hydrogen, chlorine, ammonia, nitrogen dioxide, nitric oxide, nitrous oxide and nitrogen.

The gases may be recovered, separated and liquified by known methods and utilized for industrial purposes.

The following examples illustrate the practice of the invention, in which all parts are by weight.

*Example I*

Equal parts of the following were thoroughly mixed:
Zinc, 40–80 mesh
Ammonium chloride, powdered
Ammonium nitrate, powdered Five grams of the loose mixture were placed on a refractory plate. Three drops of water were added. The mixture began to smoke and shortly a blue flame appeared followed by a mushroom shaped cloud of smoke. The presence of ammonia and chlorine were detected by their characteristic odors.

*Example II*

The following were intimately mixed:

| | Parts |
|---|---|
| Zinc, 40–80 mesh | 30 |
| Ammonium chloride, powdered | 20 |
| Ammonium nitrate, powdered | 47 |
| Polyvinyl chloride molding powder | 3 |

The mixture was heated to the softening point and the mixture pressed into blocks. Such blocks, when exposed to 85% relative humidity for six hours spontaneously burst into flame. Other such blocks when immersed in containers containing 10% water by weight of the blocks yielded copious quantities of hydrogen, ammonia, chlorine, nitrogen and nitrogen dioxide.

It has been found that up to 50% by weight of the zinc may be replaced by magnesium with substantially equivalent results.

While the invention has been described in terms of certain embodiments and examples, such are to be considered illustrative rather than limiting and it is intended that all further embodiments be covered which fall within the spirit and scope of the appended claims.

I claim:
1. A composition adapted to evolve heat and gases upon reaction with water consisting essentially of an intimate mixture of 10–70% by weight of finely divided zinc, 10–70% by weight ammonium chloride and 10–70% by weight ammonium nitrate, said percentages totalling 100%.
2. A shaped block consisting essentially of the composition of claim 1 and containing an anhydrous binder.
3. A composition adapted to evolve heat and gases upon reaction with water consisting essentially of an intimate mixture of equal parts by weight of finely divided zinc, ammonium chloride and ammonium nitrate.

References Cited by the Examiner

UNITED STATES PATENTS 2,954,284   9/1960   Toulmin _____ 149—43

OTHER REFERENCES

Bebie, "Manual of Explosives Military Pyrotechnics and Chemical Warfare Agent," The MacMillan Co., N.Y., 1943, pp. 79 and 80.

LEON D. ROSDOL, *Primary Examiner.*

BENJAMIN R. PADGETT, CARL D. QUARFORTH,
*Examiners.*